United States Patent [19]

Gindrup

[11] 3,963,682

[45] June 15, 1976

[54] POLYMERIC FUNGICIDAL COMPOSITIONS CONTAINING THE TRICHLOROMETHYL THIOIMIDE MOIETY

[75] Inventor: Wayne L. Gindrup, Houston, Tex.

[73] Assignee: Napko Corporation, Houston, Tex.

[22] Filed: Feb. 26, 1973

[21] Appl. No.: 335,665

[52] U.S. Cl. ............... 260/78 UA; 260/29.6 RW; 260/78 SC; 260/326.5 FM; 428/474; 428/500
[51] Int. Cl.$^2$.................. C08F 12/08; C08F 22/40
[58] Field of Search .............................. 260/78 U

[56] References Cited
UNITED STATES PATENTS

| | | | |
|---|---|---|---|
| 2,607,762 | 8/1952 | Bowen | 260/78 UA |
| 2,691,609 | 10/1954 | Snyder | 260/78 UA |
| 3,632,791 | 1/1972 | Rupprecht et al. | 260/78 UA |
| 3,639,357 | 2/1972 | Cohen | 260/78 UA |

*Primary Examiner*—Harold D. Anderson
*Attorney, Agent, or Firm*—James P. Dowd

[57] ABSTRACT

A polymer having fungicidal properties is prepared from a styrene maleic copolymer resin by converting the maleic portion of the resin to an imide and further reacting the imide with perchloromethyl mercaptan.

2 Claims, No Drawings

POLYMERIC FUNGICIDAL COMPOSITIONS CONTAINING THE TRICHLOROMETHYL THIOIMIDE MOIETY

BRIEF SUMMARY

The present invention relates to new and useful copolymer compositions prepared by transforming the anhydride portion of styrene maleic anhydride resins into a n-trichloromethylthioimide moiety.

The new copolymer compositions are useful as fungicides.

These products are distinct from other compositions containing the phthalimide group which have been advocated and used as fungicides for many years. Organic compounds containing phthalimide groups suffer several disadvantages. These compounds are decomposed by water, particularly in alkaline environments. When incorporated into water thinned latex paints, they slowly hydrolyse in the paint. This eventually results in coagulation of the latex binder.

The dried paint containing $R-N-S-CCl_3$ type compounds of the prior art slowly leach out of the film on exposure to the elements.

The polymeric fungicides of this invention are extremely toxic to fungi, yet are completely insoluble in water, have extremely low vapor pressures and, therefore, give lasting protection to painted surfaces.

DETAILED DESCRIPTION

In the process of carrying out my invention I proceed as follows:

A styrene maleic anhydride copolymer resin is heated at temperatures from 200° to 300°C with sufficient ammonia or ammonium hydroxide to convert the anhydride moiety to an imide.

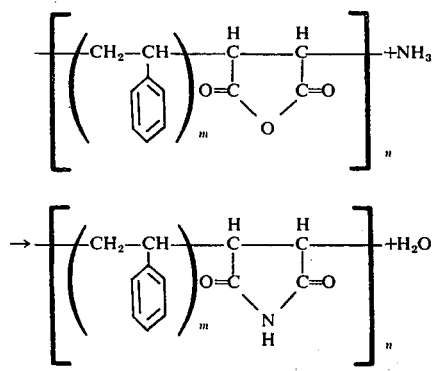

It is generally advisable to use a 25% excess of ammonia over the theoretical amount required to react with the anhydride groups.

The styrene maleic anhydride resin of this invention should preferably be a solid at room temperature. The preferred resins of this invention have a melting point between 130° and 170°C and a styrene to maleic anhydride mol ratio of between 1:1 and 3:1. This reaction is conveniently accomplished by heating the ammonium hydroxide and the styrene maleic resin in an oven.

The imidized resin is then reacted at room temperature with a dimethylformamide-methanolic alkali solution in order to form a metal salt of the imide.

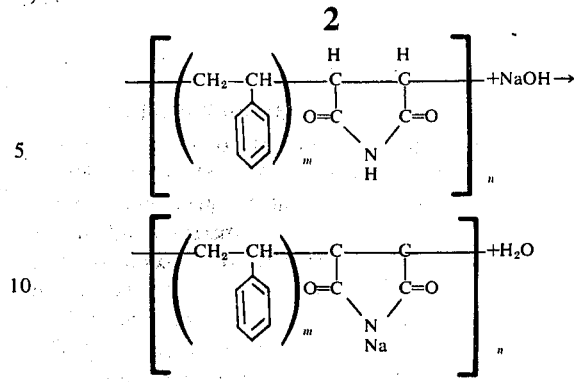

It is desirable to dissolve the imidized resin in a solvent which will also dissolve the alkali. A mixture of dimethyl formamide and methyl alcohol has been found to be particularly suited for this purpose.

The alkali metal salt of the imidized resin is next reacted with perchloroethyl mercaptan which converts the imide salt to a n-trichloromethylthioimide group. Other perchloroalkyl mercaptans would also be suitable as substitutes for perchloromethyl mercaptan.

This is accomplished by adding the perchloromethyl mercaptan directly to the alkali metal salt of the imidized resin. This reaction is easily accomplished at room temperature.

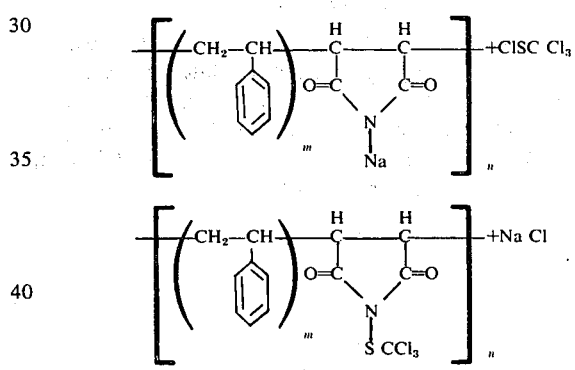

EXAMPLE 1

A one liter glass kettle, equipped with an electric heating mantle, was charged with 500 grams of ARCO SMA-2000 A (a styrene maleic copolymer having an equivalent wt. of 315, a styrene maleic ratio of 2:1 and a mol wt. of 1700). 500 ml. of concentrated ammonium hydroxide was added in 150 ml. increment with stirring. A mild exotherm was observed. The resulting thick, pasty mass was then heated to 300°C. for one hour with stirring. The molten mixture was poured onto a steel sheet and allowed to cool. The imidized resin, a golden, brittle solid was powdered and dissolved in 1200 ml. of dimethyl formamide. A solution consisting of 54 grams of KOH dissolved in 750 ml. of methanol was then added. The mixture was stirred for 1 hour. 77 ml. of perchloromethyl mercaptan was then added. The temperature of the mixture rose to 125°F. and then subsided. The mixture was poured into 9 liters of tap water. The aqueous mixture was stirred to break up the lumps and then filtered. The filter cake was washed twice with 250 ml. of water and allowed to dry at room temperature. The product was a light golden yellow powder.

EXAMPLE 2

A one liter beaker was charged with 200 ml. of concentrated ammonium hydroxide (26°Be) and 200 ml. of water. 258 grams of ARCO SMA 3000A (equivalent wt. 407, styrene to maleic ratio of 3:1 and a molecular wt. of 1900) was added gradually, stirring with a heavy spatula. The yellowish, lumpy mass was allowed to sit for 1½ hours. During this time the contents become greenish yellow with a waxy consistency. This was broken up, crushed and placed in a 1 qt. casserole. The casserole was heated to 300°C. for 1 hour in an oven. The mixture was stirred at intervals to aid the release of gas.

The golden yellow imidized resin was allowed to cool, and then broken up. It was then charged into a 1 liter beaker together with 100 ml. of dimethyl formamide and 200 ml. of methyl alcohol. The mixture was agitated until the resin was dissolved. Then 17.9 grams of flake sodium hydroxide and 175 ml. of water were added. The mixture was stirred until the sodium hydroxide had dissolved. Then 47 ml. of perchloromethyl mercaptan was added. Immediately a precipitate formed. The mixture was filtered and the precipitate was washed with water and dried.

EXAMPLE 3

The polymeric fungicide of example 1 was dispersed in an exterior grade polyvinyl acetate latex paint at a ratio of 5 pounds of polymeric fungicide in 100 gallons of latex paint. The paint was then stored for six months at 25°C. At the end of 6 months the paint was still fluid. There was no increase in viscosity.

The paint was then applied to wooden panels and exposed 6 months in Florida. There was no mold growth observed on the surface of the paint.

I claim:

1. A Polymeric, resinous fungicide consisting essentially of repeating units having the formula:

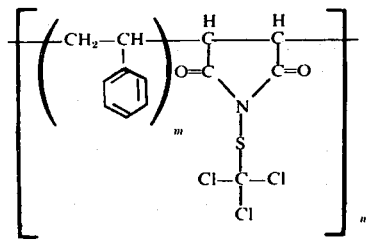

where $n$ is 2 to 6 and $m$ is 1 to 3.

2. A method of preparing a polymeric, resinous fungicide having pendant n-trichloromethylthioimide groups which comprises:
   a. converting the anhydride groups of a styrene-maleic anhydride copolymer resin to imide groups by heating said copolymer resin at temperatures from 200° to 300° C. with sufficient ammonia or ammonium hydroxide to convert the anhydride moiety to an imide moiety,
   b. forming the alkali metal salt of said imide moiety by treating the imidized resin with enough alkali metal hydroxide to react with the imide moiety,
   c. converting the alkali metal salt of said imide moiety to a n-trichloromethylthioimide moiety by reacting said alkali metal salt with perchloromethyl mercaptan sufficient to convert the alkali metal salt of the imidized resin to a n-trichloromethylthioimide moiety.

* * * * *